G. M. BICKNELL AND H. H. C. WEED.
FLOATING BEARING.
APPLICATION FILED JULY 15, 1918.
1,324,374.
Patented Dec. 9, 1919.
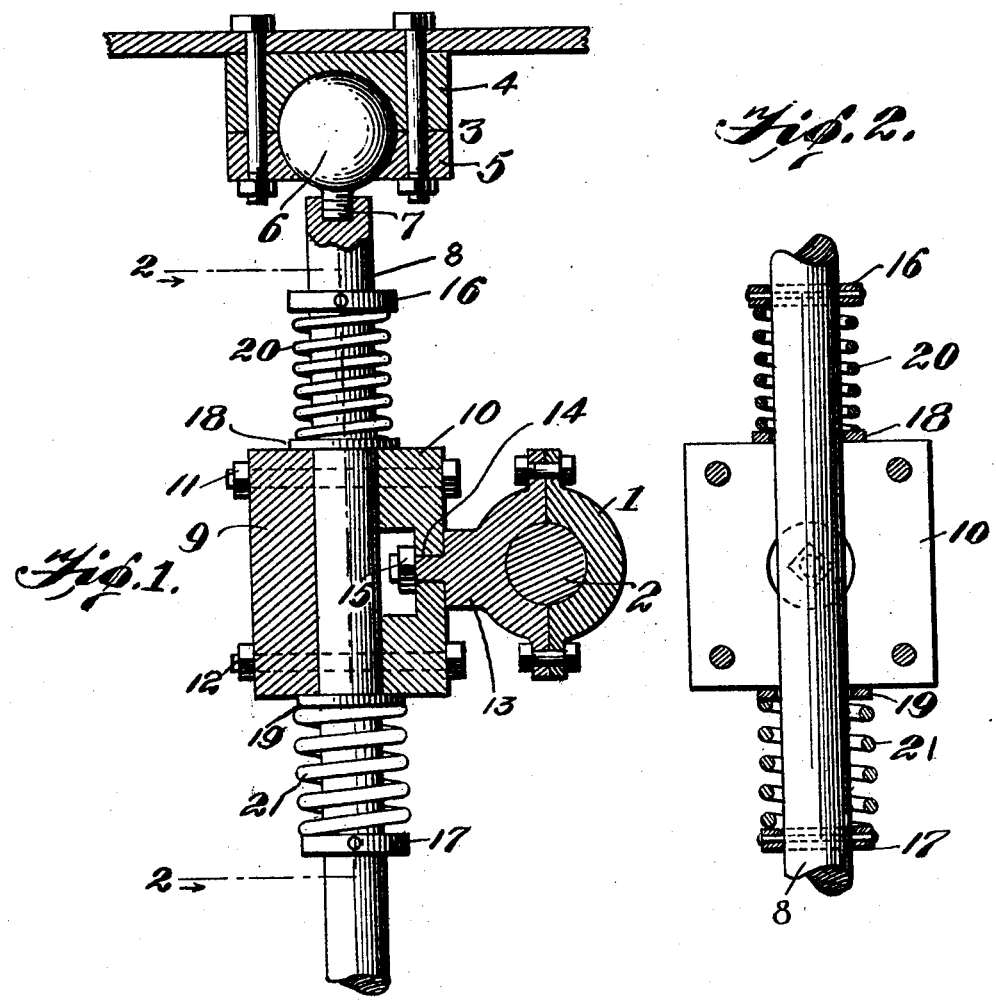
Inventor
George M. Bicknell.
Hugh H. C. Weed.
By
Attorney.

UNITED STATES PATENT OFFICE.

GEORGE M. BICKNELL, OF DETROIT, MICHIGAN, AND HUGH H. C. WEED, OF ST. LOUIS, MISSOURI, ASSIGNORS TO THE CARTER CARBURETER COMPANY, OF ST. LOUIS, MISSOURI, A CORPORATION OF MISSOURI.

FLOATING BEARING.

1,324,374.   Specification of Letters Patent.   Patented Dec. 9, 1919.

Application filed July 15, 1918. Serial No. 245,008.

*To all whom it may concern:*

Be it known that we, GEORGE M. BICKNELL and HUGH H. C. WEED, citizens of the United States, and residing at Detroit, in the county of Wayne, Michigan, and at St. Louis, Missouri, respectively, have invented certain new and useful Improvements in Floating Bearings, of which the following is a specification.

This invention relates to attachments for bearings adapted for application to rotating shafts, and more particularly to shafts which are subjected to high speed rotation. The primary object of the invention is the prevention of the whipping of shafts.

The generally accepted idea of the so-called whipping is the tendency of high speed shafting to travel, in response to centrifugal force, in a circle larger than the diameter of the shaft. This circular travel is in addition to the rotation of the shaft under applied power. The shafts are ordinarily held in fixed bearings, generally at least two in number, and the portions of the shafts which are subjected to the whipping action are located between the fixed bearings. The circle of travel of the whipping portions would manifestly be around a center which is in the center of the shaft when it is at rest. It will be very readily understood that the whipping action is exceedingly destructive to the fixed bearings and to the shaft itself.

As before stated, a whipping shaft travels in a circle larger than its own diameter. Our conception is that any discouragement of the tendency of the shaft to travel in a true circle, by destroying or retarding its continuity of movement, or impulse in a fixed circular direction, will tend to cause the shaft to more nearly assume its normal straight alinement.

The invention is especially adapted for automobile shafting but it is to be clearly understood that it may be advantageously used on any high speed shafts. In automobile drive shafts a very large percentage of the destructive wear on universal joints is occasioned by shaft whipping. This wear has caused the adoption of heavier drive shafts, of abnormal diameter, which manifestly do not whip to so great an extent, because less resilient, but has occasioned a very material increase in cost of production. These heavier shafts are also objectionable in that they add to the burden of the universal joint. With the use of our invention, a long drive shaft of normal diameter will show a smaller degree of whipping tendency, and consequently cause less wear upon the bearings, than will a shaft of the same length and of abnormally large diameter.

We have observed that the whipping action is better retarded by opposing unequal resistance to the tendency of the shaft to swing in a circle. A fixed resistance of the tendency to travel to the left, for instance, should be met by either a greater or less resistance to travel to the right. Moreover, it is obvious that, in order for the shaft to travel in a circular path, the whipping portion must move upwardly and downwardly, at some point in the circle. This resistance may be applied as desired, but it is to be noted that, if equal resistance is moderately applied to movement in all directions, the whipping action will not be entirely eliminated.

Our invention therefore, by providing unequal resistance to shaft movement in different directions, renders a true circular or "whipping" movement impossible, offering at the same time no resistance to the rotative movement within the bearings.

In the accompanying drawings forming a part of this specification, we have illustrated a preferred embodiment of our invention, and have chosen to illustrate the invention applied to the drive shaft of an automobile.

In the drawings—

Figure 1 is a plan view, partly in section, illustrating the invention applied to a drive shaft; and Fig. 2 is a side plan view.

The invention comprises preferably a split bearing 1, adapted to surround the shaft 2.

Fixed to any convenient part of an automobile, such as a cross-member, is a socket member 3, here shown as comprised of two plates 4 and 5, shaped to receive a metallic ball 6, provided with a screw threaded shank 7, the plates 4 and 5 are preferably secured to the cross member by bolts, as shown in Fig. 1.

Secured to the shank 7 is a bar 8, preferably provided with an inwardly screw threaded socket to receive said shank. The disposition of the several elements is such that the bar 8, when connected as described, will assume a position adjacent the bearing 1.

Surrounding the bar 8, is a split collar comprised of two plates 9 and 10 having interior faces grooved to effect a sliding contact with the said bar. Said plates are held in their relative positions by means of bolts 11 and 12 extending therethrough. In lieu of this construction, it is obvious that an integral collar might be substituted.

The bearing 1 is provided with a shank 13 having a projection 14 extending through the adjacent face of the plate 10, the end of said projection being screw threaded to receive a nut 15.

The bar is provided above the said collar, with a peripheral flange or shoulder 16, which may be integral or not, as desired, and a similar flange 17 is provided below the shoulder. Surrounding the bar 8, and held between the flanges 16 and 17, and washers 18 and 19, respectively, are coiled springs 20 and 21. Said springs are of unequal strength.

From the foregoing the operation of the device is clear. Through the ball and socket connection of the bar 8, it is rendered free to swing in any direction laterally, and will readily accommodate itself to any longitudinal movement of the shaft 2, but will not move in response to any vertical vibration of the shaft. This vertical movement therefore causes the collar (formed by the plates 9 and 10), to ride vertically upon the bar 8, such movement being yieldingly resisted by the springs 20 and 21, dependent upon whether the collar is rising or falling. It will be seen therefore that, since the lateral or longitudinal movement of the shaft is not resisted, but that all vertical movement is frictionally opposed, and with unequally yielding resistance, any whipping action of the shaft is prevented because it cannot assume a circular course of travel.

It is obvious that in actual practice of the invention, lubricating devices, such as oil cups, should be applied to all points where there is frictional contact. Since these devices form no part of our invention, they are not shown in all instances where they would be necessary.

Various modifications of the invention may be suggested to those skilled in the art to which the invention appertains, but we desire to secure by Letters Patent all such embodiments thereof as fall fairly within the scope of the appended claims.

It is to be understood that, while we have shown a member mounted to assume a vertical position adjacent the shaft, the member might just as well be mounted to extend laterally above or below the shaft. In this event, the lateral movement of the member, the bearing, or the shaft, as herein described, both in the specification and claims, might properly be termed a vertical movement, and vice-versa. The appended claims cover this mechanical equivalent.

What we claim is:

1. A device of the character described comprising in combination with a rotatable shaft, a floatable bearing engaging the shaft, and means unequally imposing a yielding resistance against vertical movement of the shaft in opposite directions while permitting any lateral movement thereof.

2. A device of the character described comprising, in combination with a rotatable shaft, a floatable bearing engaging the shaft, a swinging element having its free portion adjacent the bearing and means on the element for unequally imparting a yielding resistance against vertical movement of the shaft in opposite directions while permitting any lateral movement thereof.

In testimony whereof we affix our signatures.

GEORGE M. BICKNELL.
HUGH H. C. WEED.